United States Patent
Nguyen et al.

(10) Patent No.: US 7,661,942 B2
(45) Date of Patent: Feb. 16, 2010

(54) DEVICE FOR MOLDING A KEYHOLE SIPE IN A TIRE TREAD

(75) Inventors: Gia-Van Nguyen, Rossignol (BE); Alain Francois Emile Roesgen, Asselborn (LU); Anne-France Gabrielle Jeanne-Marie Cambron, Angelsberg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 589 days.

(21) Appl. No.: 11/186,612

(22) Filed: Jul. 21, 2005

(65) Prior Publication Data

US 2006/0144491 A1 Jul. 6, 2006

Related U.S. Application Data

(60) Provisional application No. 60/640,386, filed on Dec. 30, 2004.

(51) Int. Cl.
- B29C 33/44 (2006.01)
- B29D 30/58 (2006.01)
- B60C 11/12 (2006.01)

(52) U.S. Cl. .......... 425/28.1; 152/209.21; 152/DIG. 3; 249/183; 249/184; 264/313; 264/318; 264/326; 425/46; 425/438; 425/DIG. 58

(58) Field of Classification Search .......... 249/142, 249/183, 184; 425/28.1, 35, 37, 46, 438, 425/DIG. 58; 264/313, 318, 326; 152/209.17, 152/209.21, DIG. 3

See application file for complete search history.

(56) References Cited

U.S. PATENT DOCUMENTS

| 1,625,644 | A | | 4/1927 | Fisher |
|---|---|---|---|---|
| 2,736,924 | A | | 3/1956 | Bean |
| 2,779,060 | A | * | 1/1957 | Knox ......................... 425/28.1 |
| 3,115,919 | A | | 12/1963 | Roberts |
| 3,743,236 | A | * | 7/1973 | Schwenk et al. ...... 425/DIG. 58 |
| 4,154,564 | A | | 5/1979 | French |
| 5,385,189 | A | * | 1/1995 | Aoki et al. ............. 152/DIG. 3 |
| 5,964,118 | A | | 10/1999 | Kamata |
| 6,193,492 | B1 | | 2/2001 | Lagnier et al. |
| 6,264,453 | B1 | | 7/2001 | Jacobs et al. |
| 6,408,911 | B1 | | 6/2002 | Tanabe et al. |
| 2004/0055683 | A1 | | 3/2004 | Feider et al. |

FOREIGN PATENT DOCUMENTS

JP 09-038978 * 2/1997

* cited by examiner

*Primary Examiner*—Steven D Maki
(74) *Attorney, Agent, or Firm*—Wood, Herron & Evans, L.L.P.

(57) ABSTRACT

The present invention provides for an improved device for molding keyhole sipes larger in size, i.e. sipes having a wider passage, than currently being formed in treads that will avoid damaging the tread during formation and removal thereof from a mold. The device includes an elongated deformable body member having a blade extending in a direction away therefrom and substantially along the length thereof. The body member also includes a stiffening member securely fixed in position therein that extends substantially the length thereof. The stiffening member provides a desired rigidity to the deformable body member, thereby limiting flexion along its length under the stress of a rubber formulation when the mold is closed during the molding process. Also, the deformable body member provides low stress on the tread when a slit of the keyhole sipe is pulled around the body member during removal of the tread from a mold.

20 Claims, 7 Drawing Sheets

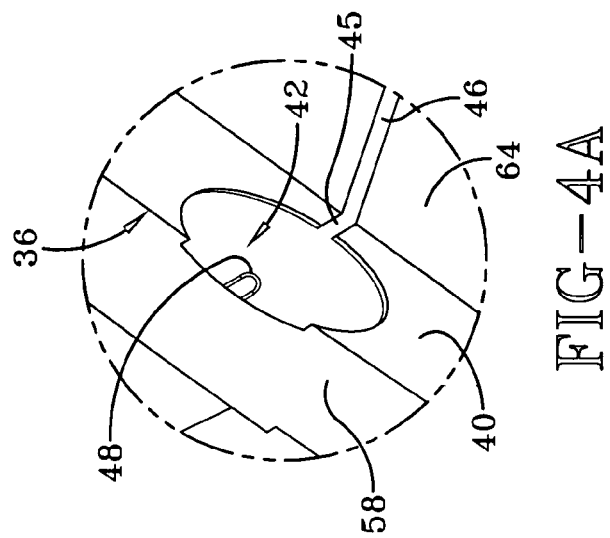
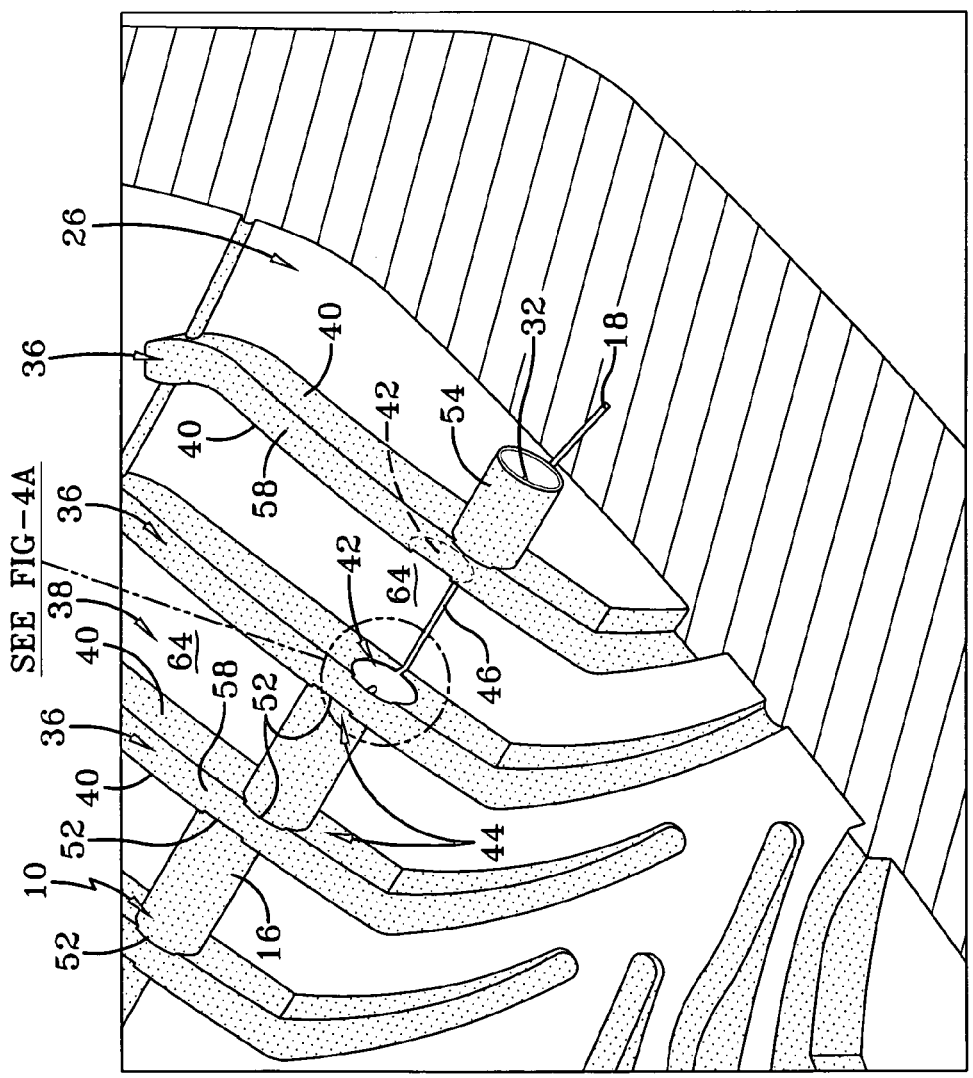

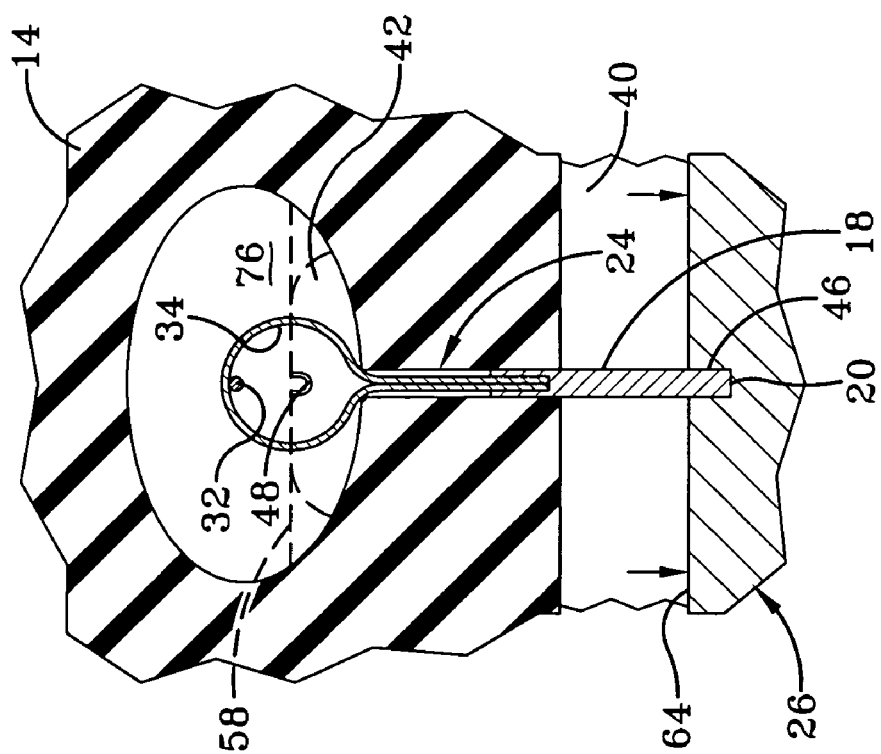
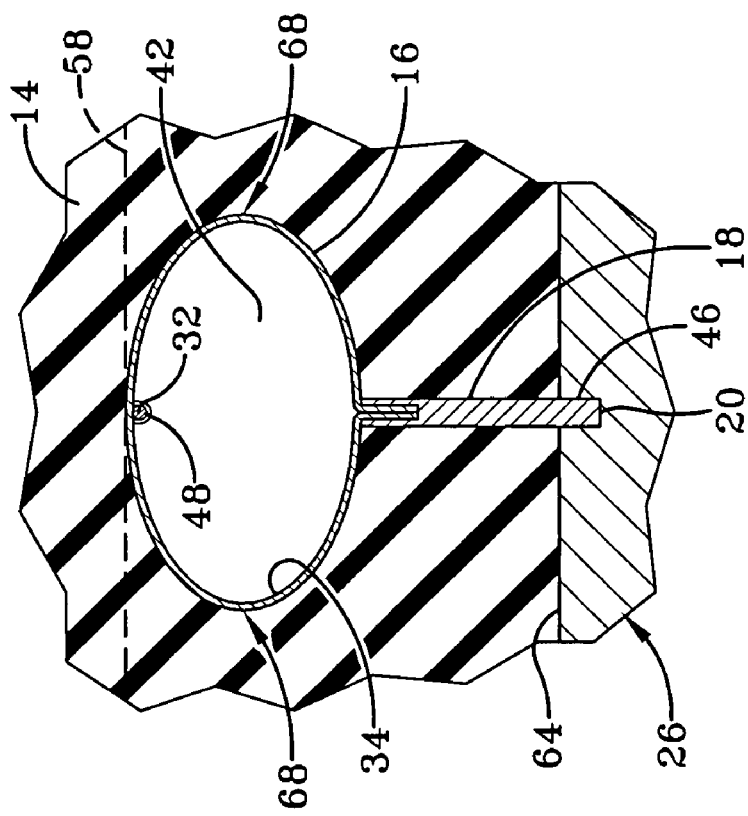

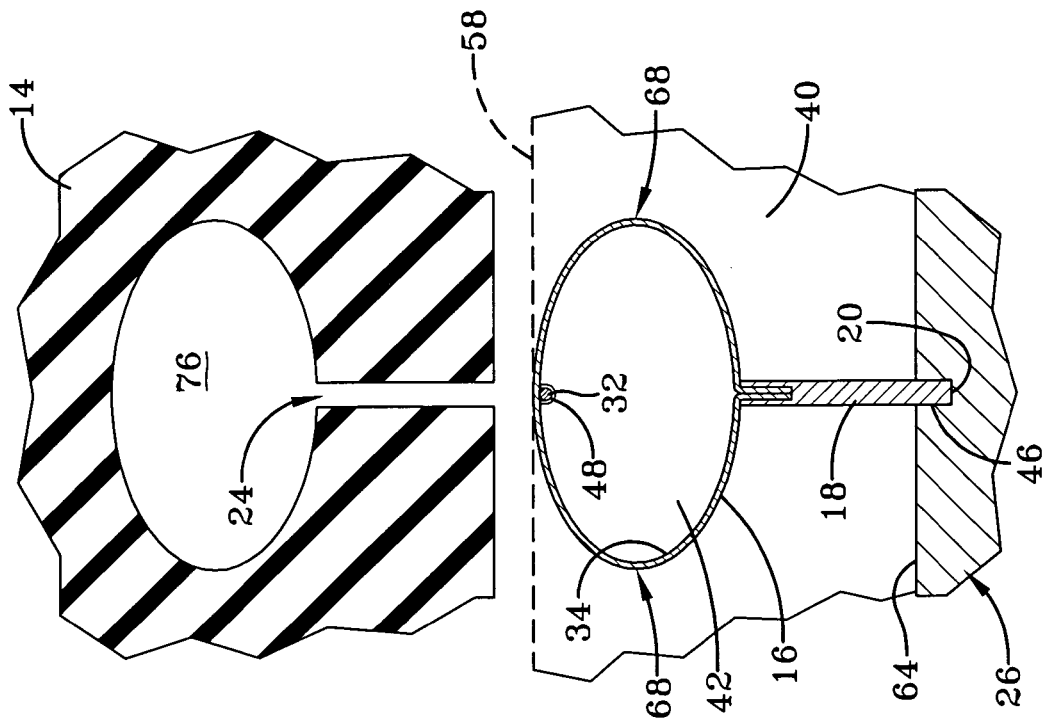
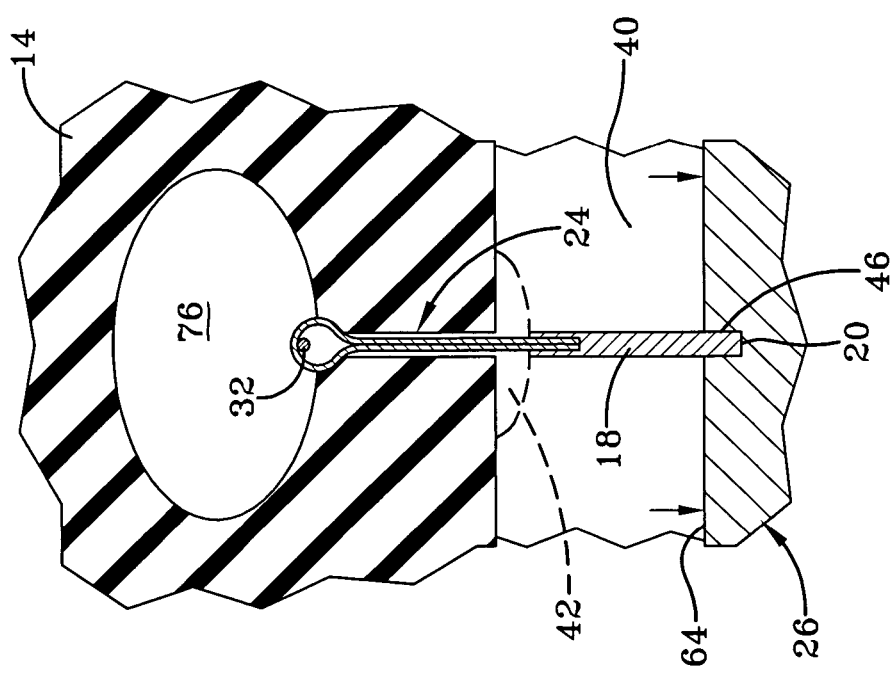

DEVICE FOR MOLDING A KEYHOLE SIPE IN A TIRE TREAD

CROSS-REFERENCE TO RELATED APPLICATIONS

This application claims the benefit of and priority to prior filed and co-pending U.S. Provisional Patent Application Ser. No. 60/640,386 to Nguyen et al., filed Dec. 30, 2004, entitled "Device For Molding A Keyhole Sipe In A Tire Tread," which is hereby incorporated by reference herein in its entirety.

FIELD OF THE INVENTION

The present invention pertains generally to devices intended to equip molds for molding objects made of rubber and, more particularly, to devices for molding keyhole sipes in the treads of pneumatic tires.

BACKGROUND OF THE INVENTION

As a tire wears down its tread, the volume of the grooves therein is reduced, which can lead to poor hydroplaning performance. To increase the worn groove volume, keyhole sipes, i.e. sunken tire grooves having a keyhole cross-section, are incorporated into the tread. Each keyhole sipe typically includes a slit defining an opening at a surface of the tread and a passage formed therebelow that cooperates with the slit to increase the tread's worn groove volume.

To form these keyhole sipes, molds are equipped with sipe-forming devices, which are well known in the art of tire manufacture. The molds may be used for producing a tread member only, as for use in retreading a previously cured tire, or for forming a tread design on a green tire. Such sipe-forming devices conventionally include a base, or body member, provided with a blade that typically is made from a running length or strip of a metallic material such as steel, stainless steel, or brass. The blade is shaped to form the slit in the tire tread while the body member produces the passage underneath the tread surface, thereby producing the keyhole-shaped cross-section of the sipe. In forming the keyhole sipe, the molding device is positioned within a channel in the mold so that the blade cooperates with a surface of the channel and the body member is spaced apart therefrom, respectively, to form the slit in the tire and the passage underneath the tread surface. Next, the rubber formulation is introduced into the mold. The mold then is closed and the tread allowed time to cure. Finally, the mold is opened and the tread removed therefrom with the molding device having formed the keyhole sipe therein.

One drawback with current molding devices includes an inability of the body member to deform, or compress, during tread removal thereby placing high stress on the tread when the slit of the formed keyhole sipe is pulled around the body member of the molding device. Notably, if the body member exceeds a certain size parameter, i.e. a certain width, there is a high likelihood that the tread will be damaged, such as by being torn, during removal from the mold. Deformable body members have been proposed in an effort to replace non-deformable members to reduce the stress on the tread during removal thereof. However, one drawback with these types of current devices includes the tendency of the deformable body member to inwardly flex, or collapse, along its length under the stress of the rubber formulation when the mold is closed during the molding process. This inward distortion damages the tread during tread formation by producing a misshapen keyhole, i.e. a misshapen passage.

Because of the above limitations, current molding devices are designed according to certain size parameters to avoid damaging the tire tread during tread formation. More specifically, the body members of current molding devices typically have a width not greater than about 3.5 mm while the blade typically is not greater than about 0.8 mm in thickness. Since a larger keyhole sipe, i.e. one having a wider passage, would be better able to provide wet traction of the tire and be better able to reduce air transfer noise, the tire industry has long felt a need for a molding device having a wider body member that can produce a larger-sized keyhole sipe without causing damage to the tread during the molding process.

Accordingly, there is a need for an improved device for molding keyhole sipes larger in size, i.e. sipes having a wider passage, than currently being formed in treads that will provide a properly shaped keyhole sipe and avoid damaging the tread during formation and removal thereof from the mold, thereby providing the worn tire tread greater hydroplaning performance.

SUMMARY OF THE INVENTION

The present invention provides for an improved device for molding keyhole sipes in a tire tread that does not have the drawbacks of the molding devices currently employed.

To this end, the device includes an elongated body member having a blade extending in a direction away therefrom and substantially along the length thereof. The blade includes a distal end defining an edge and generally is composed of a metal or metal alloy. The body member is composed of a deformable material to provide low stress on the tread when the slit of the formed keyhole sipe is pulled around the body member during removal of the tread from the mold. This deformable material may include an elastic material, a shape memory material, or a metal or metal alloy. The body member is configured to deform upon removal of the cured tread member, and not during actual molding. The blade may be integrally formed with the body member or secured thereto by means commonly known in the art.

The body member further includes a cavity extending therethrough along the length thereof. A stiffening member is securely fixed in position within the cavity and extends substantially along the length of the body member to provide a desired rigidity, thereby limiting flexion along the length of the body member under the stress of the rubber formulation when a tread mold is closed during the molding process. The stiffening member may include a metal or metal alloy, or a plastic material.

In an exemplary embodiment, the stiffening member defines a bar which is secured to an inner surface of the body member in a position substantially opposite the blade. In another exemplary embodiment, the stiffening member, e.g. a bar, is separately provided. After a tread mold has received the body member, this stiffening member is inserted within the cavity with its ends being in contact with the tread mold to securely position the stiffening member within the cavity substantially adjacent an inner surface of the body member, preferably in a position opposite the blade, and along the length of the body member. In yet another exemplary embodiment, a proximal end of the blade extends within the cavity to a position at least substantially adjacent the inner surface of the body member and substantially along the length of the body member, the stiffening member being defined by the proximal end of the blade. In this embodiment, the proximal end of the blade may contact the inner surface of the body member. In each case, the stiffening member provides a desired rigidity to the body member, thereby limiting flexion of the body member along the length thereof under the stress of the rubber formulation when a tread mold is closed during the molding process.

The blade is provided with a thickness of about 0.3 to 2.0 mm, advantageously, about 0.5 to 1.0 mm, and the body member includes an oversized width of about 3-12 mm, advantageously, about 4-11 mm, more advantageously about 5-10 mm, so as to form an oversized passage in the keyhole sipe in the tire tread.

The device for producing the keyhole sipe is adapted to be placed within a mold for molding the tread, which may be intended for either a new or re-treaded tire. The mold is provided with at least two raised portions having a channel therebetween. In designing the tire tread, the raised or positive portion of the mold corresponds to a channel in the cured tread, such as for conducting water away from the road-contacting surface of the tire. Similarly, the channel in the mold corresponds to a tread block, the outermost portion thereof in the cured tread making contact with the road surface. Each raised portion includes a grooved area adapted to receive each of the ends of the device.

A slot also is provided within a surface of the channel. The slot cooperates with corresponding grooved areas and is adapted to receive the edge of the blade. A stop optionally may be provided in each groove, the slot being adapted to abut against an end of the stiffening member when the device is inserted therein, thereby helping prevent flexion, or deformation, of the body member during formation of the keyhole sipe. Accordingly, each end of the device is secured within one of the grooved areas so that the device extends across the width of the channel between the raised portions with the edge of the blade being securely received within the surface of the channel.

When the desired number of devices with stiffening members are appropriately securely situated in the mold, the rubber formulation for the tread is introduced therein. The mold then is closed and the tread allowed time to cure. During this process, the stiffening member provides a desired rigidity to the deformable body member, thereby limiting flexion thereof along its length proximate the stiffening member under the stress of the rubber formulation when the mold is closed. Finally, the mold is opened and the tread removed therefrom wherein the body member compresses, or deforms, inwardly along its sides, thereby elongating to provide low stress on the tread when the slit of the formed keyhole sipe is pulled around the body member.

The formed tread includes at least one keyhole sipe having a slit defining an opening at a surface of the tread and a passage, being properly formed, below the surface that cooperates with the slit to increase the tread's worn groove volume. Consequently, the slit is formed having a width of about 0.3 to 2.0 mm, advantageously, about 0.5 to 1.0 mm, and the passage is formed having a width of about 3-12 mm, advantageously, about 4-11 mm, more advantageously about 5-10 mm, so as to provide a more desirable wet traction for a tire, and a reduction in air transfer noise. Accordingly, dimensions of the keyhole sipe, particularly the passage, exceed the maximum limits of current sipes.

By virtue of the foregoing, there is thus provided an improved device for molding keyhole sipes larger in size, i.e. sipes having a wider passage, than currently being formed in treads that avoids damaging the tread during formation and removal thereof from the mold.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 4 is a cut-away perspective view of a mold for molding a tire tread that is equipped with the device of FIG. 1;

FIG. 4A is an enlarged view of the incircle portion of FIG. 4 showing the grooved area;

FIGS. 6A-6D are cross-sectional views of FIG. 4 illustrating the molding process including removal of the tread from the mold;

DETAILED DESCRIPTION OF THE DRAWINGS

Figure 1:
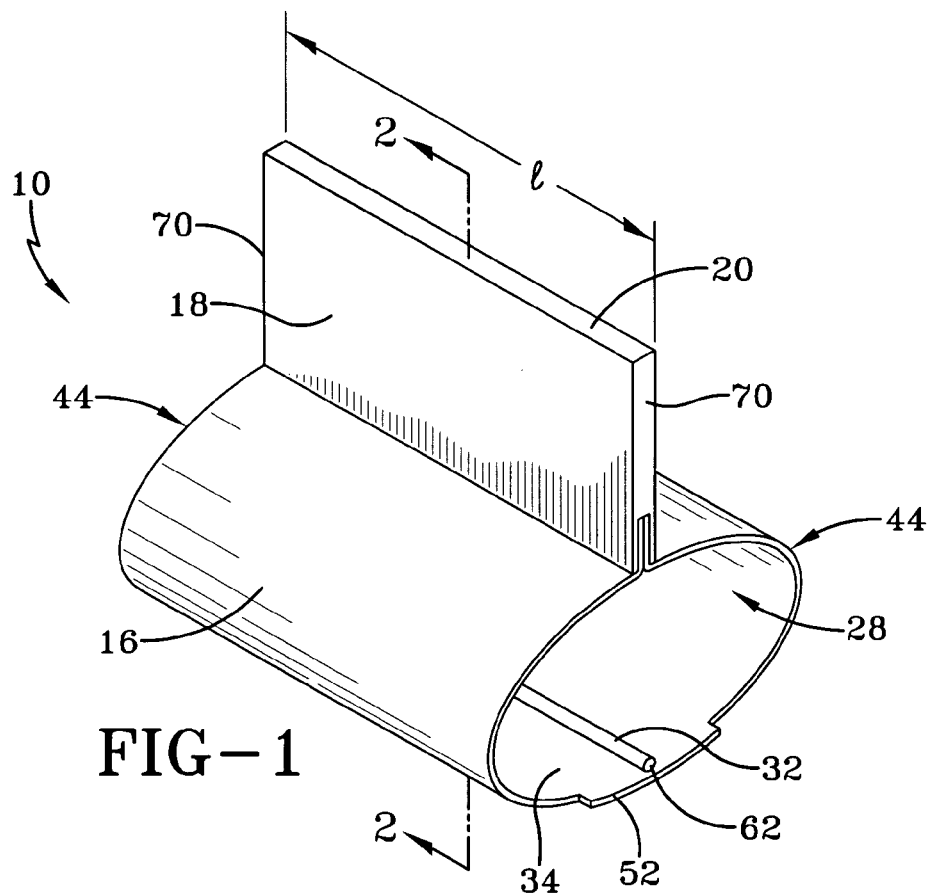
FIG. 1 is an enlarged perspective view of one embodiment of the device of the present invention for molding a keyhole sipe in a tire tread.
Figure 2:
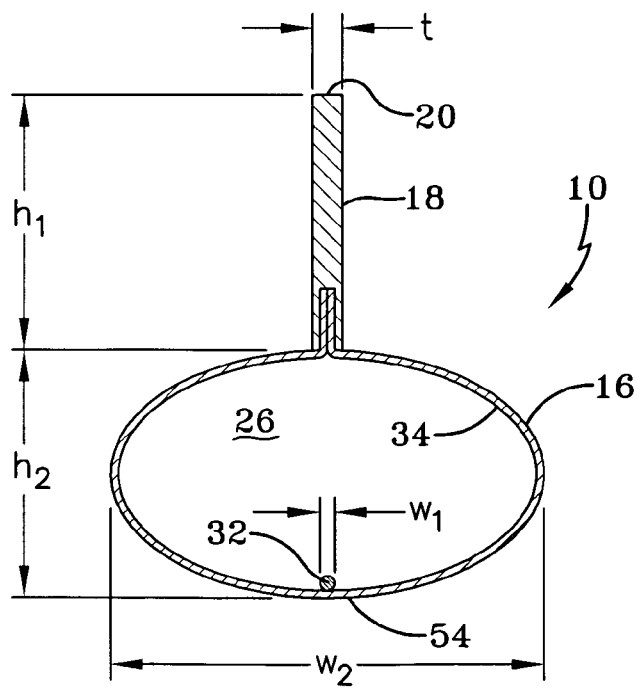
FIG. 2 is a cross-sectional view of FIG. 1 taken along lines 2-2.

As best shown in FIGS. 1-3, and 5, the device 10 of the present invention for forming a keyhole sipe 12 (FIG. 8) in a tire tread 14 (FIG. 7) includes an elongated body member 16 having a blade 18 extending in a direction away therefrom and substantially along the length (l) thereof. The blade 18 includes a distal end defining an edge 20 and preferably is composed of a metal or metal alloy, such as steel, aluminum, brass, and the like. However, it should be understood that other materials may be equally suitable for forming the blade 18, for example, a high temperature or heat-resistant plastic material.

The body member 16 is composed of a deformable material in order to provide low stress on the tread 14 when a slit 24 (FIG. 8) of the keyhole sipe 12 is pulled around the body member 16 during removal of the tread 14 from a mold 26 (FIGS. 4 and 5) as further discussed below. This deformable material includes a metal, such as aluminum, steel, and the like, or metal alloy, preferably having a desired elastic deformation. The deformable material also may be an elastic material, such as a synthetic or natural rubber, or a shape memory material, such as a shape memory polymer or alloy (e.g. Ni—Ti). While the deformable material preferably has an elastic property so that the body member 16 can recover its original pre-deformed shape, it should be understood that the deformable material may be devoid of this elastic property. The blade 18 is secured to the body member 16, such as by welding. In addition, any other means commonly known in the art, such as an adhesive, male/female mating portions, and the like, may be used to join the blade 18 and the body member 16. The blade 18 also may be integrally formed with the body member 16.

Figure 3:
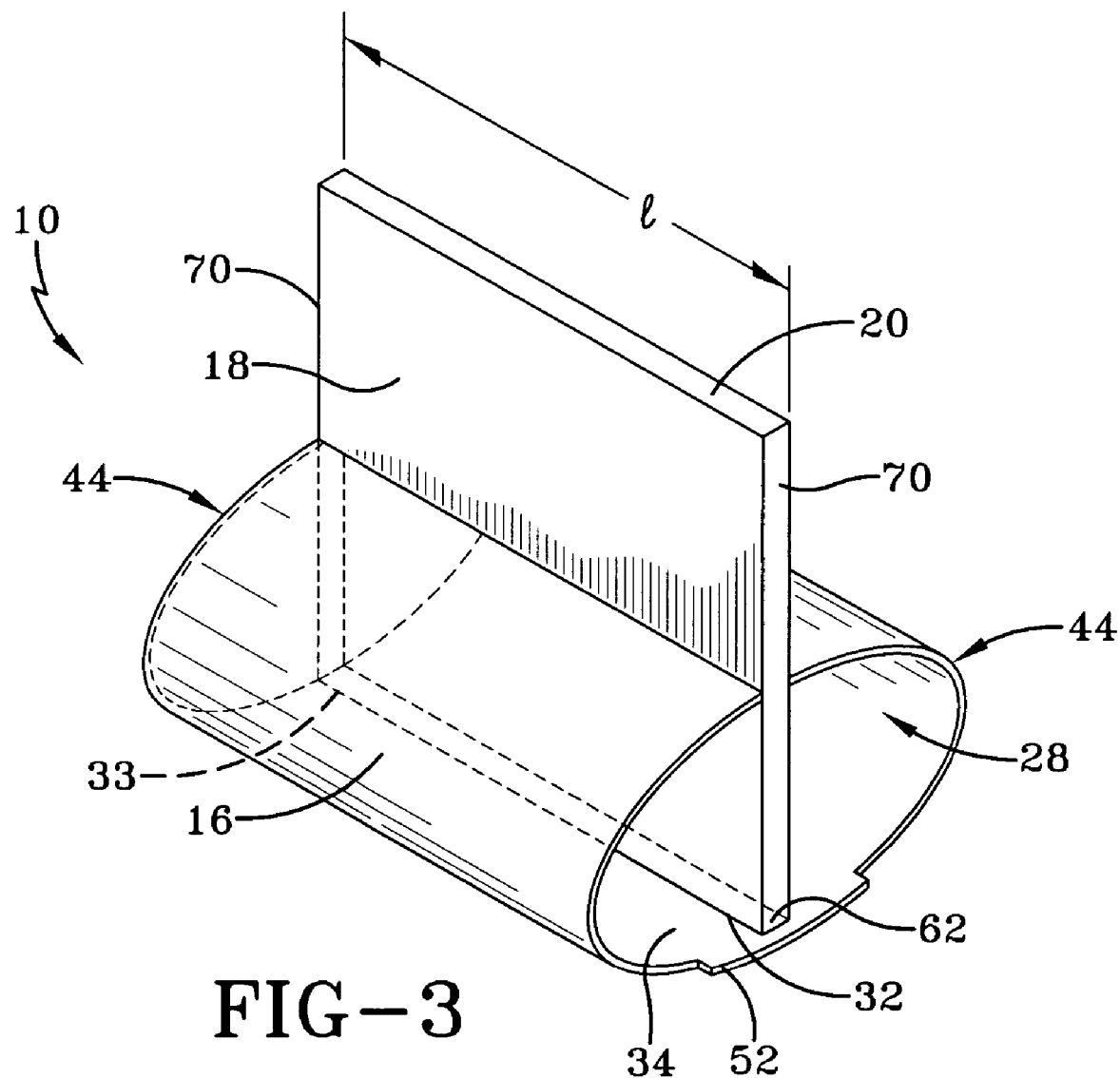
FIG. 3 is another embodiment of the device for molding a keyhole sipe in a tire tread.
Figure 5:
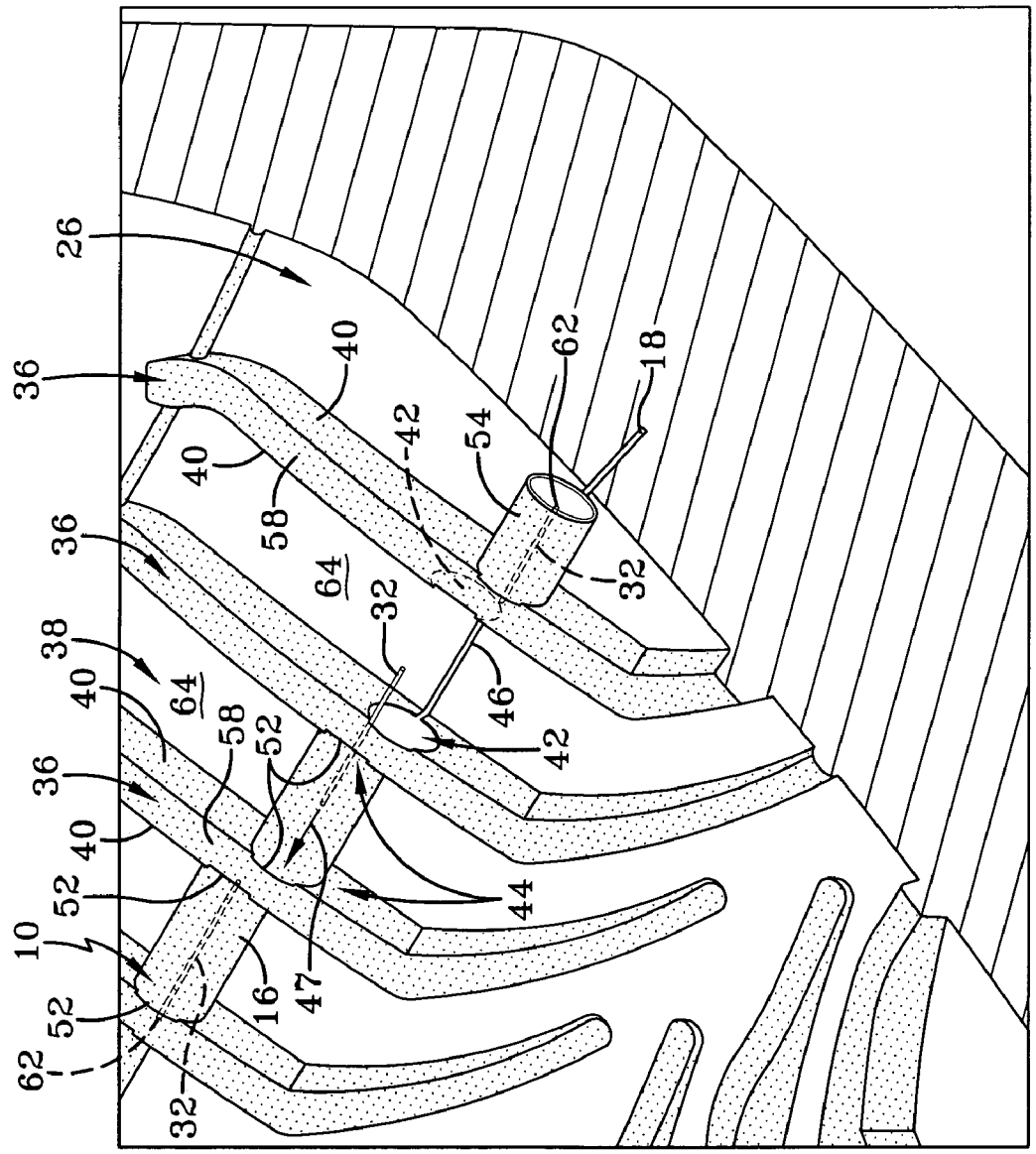
FIG. 5 is a cut-away perspective view of a mold for molding a tire tread that is equipped with another embodiment of the device in accordance with the present invention.

The body member 16 further includes a cavity 28 extending therethrough along the length (l) thereof. As shown in FIGS. 1, 3 and 5, a stiffening member 32 is securely fixed in position within the cavity 28 and extends substantially along the length (l) of the body member. With specific reference to FIG. 1, the stiffening member 32 defines a bar secured within the cavity 28 to an inner surface 34 of the body member 16 in a position substantially opposite the blade 18 to provide a desired rigidity to the deformable body member 16, thereby limiting flexion along its length (l) under the stress generated during the molding process after the mold 26 is closed, wherein the stress is transmitted through the rubber formulation as discussed below. Although the stiffening member 32 shown in FIG. 1 is secured to an inner surface 34 of the body member 16, it should be understood, as shown in FIG. 5 and further described below, that the stiffening member 32 may be provided separately and inserted through the cavity 28, after the body member 16 has been secured within the mold 26, with the ends 62 of the stiffening member 32 being in contact with the tread mold 26, thereby securely positioning the stiffening member 32 within the cavity 28 substantially adjacent an inner surface 34 of the body member 16.

In another embodiment, as shown in FIG. 3, a proximal end 33 of the blade 18 of the device 10 extends into the cavity 28 to substantially adjacent the inner surface 34 of the body member 16, and substantially along the length (l) thereof, the stiffening member 32 being defined by the proximal end 33 of the blade 18 and further understood as being securely fixed in position within the body member 16. Accordingly, the proximal end 33 of the blade 18 provides a desired rigidity to the body member 16, thereby limiting flexion along the length (l) thereof under the stress generated during the molding process after the mold 26 is closed, wherein the stress is transmitted through the the rubber formulation. Although shown in FIG. 3 as being substantially adjacent the inner surface 34 of the body member 16, it should be understood that the proximal end 33 of the blade 18 may come into contact with the inner surface 34 of the body member 16.

The stiffening member 32 may include a metal, such as steel or aluminum, or a metal alloy. It should be understood that the stiffening member 32 also may be formed of a plastic material, preferably, a heat-resistant plastic material. The stiffening member 32 advantageously is no greater in width ($w_1$) than the thickness (t) of the blade 18 to allow for easy removal of the formed tread 14 from the mold 26. In addition, although represented as a bar in FIGS. 1 and 5, it should be understood that the stiffening member 32 may take on any number of shapes and configurations, including tubular, rectangular, and the like.

With reference to FIGS. 1-3 and 5, the thickness (t) of the blade 18 should be about 0.3 to 2.0 mm, advantageously, about 0.5 to 1.0 mm, and the body member 16 has a width ($w_2$) of about 3-12 mm, advantageously, about 4-11 mm, more advantageously about 5-10 mm, for forming the keyhole sipe 12 in the tread 14. The height ($h_1$) of the blade 18 may vary but preferably is about 3-6 mm while the height ($h_2$) of the body member 16 similarly may vary but also preferably is about 3-6 mm.

As best shown in FIGS. 4 and 4A, the device 10 for forming a keyhole sipe 12 is to be placed within the mold 26 (shown in partial) for molding the tread 14 which may be intended for either a new or re-treaded tire (not shown). More specifically, the mold 26 includes a plurality of raised portions 36 with a channel 38 therebetween. Side walls 40 of the raised portions 36 are provided with cooperating grooved areas 42 including slots 45. The grooved areas 42 with slots 45 are shaped to receive an end 44 of the device 10, which includes an end 70 of the blade 18. A slot 46 also is provided within a surface 64 of each channel 38. The slot 46 cooperates with the slot 45 of the corresponding grooved areas 42 and is adapted to securely receive the edge 20 of the blade 18. For the insertion of the device 10 of FIG. 1, each grooved area 42 further includes a stop 48 which is incorporated into the mold 26 and adapted to abut against an end 62 of the stiffening member 32 when the device 10 is inserted therein to help prevent flexion, or deformation, of the body member 16 during formation of the keyhole sipe 12. It should be understood by one skilled in the art that the stops 48 are not needed for the devices 10 shown in FIGS. 3 and 5. The device 10 of FIG. 5, which further includes a separate stiffening member 32, is inserted and securely fixed in position within the cavity 28 as further discussed below.

The device 10 further is provided with optional flanges 52 extending outwardly from the top 54 of the body member 16 at a location opposite the blade 18. These flanges 52 are adapted to abut against the top surface 58 of the raised portions 36 to further help prevent flexion, or deformation, of the body member 16 during formation of the keyhole sipe 12. These flanges 52 may be composed of the same deformable material as the body member 16, as above described, and are secured thereto such as by welding. In addition, any other means known in the art, such as an adhesive, and the like, may be used to join the flanges 52 and the body member 16. The flanges 52 also may be integrally formed with the body member 16.

Accordingly, with further reference to FIGS. 4 and 4A, to equip the mold 26 with the device 10, each of the ends 44 of the device 10, including the ends 70 (FIG. 1) of the blade 18, respectively, is secured, such as by friction fit or by being wedged, within one of the grooved areas 42 and corresponding slot 45 so that the device 10 extends across the width of the channel 38 between raised portions 36. Specifically, for the insertion of the device 10 of FIG. 1, the ends 62 of the stiffening member 32 abut against the stops 48 while the flanges 52 abut against the top surface 58 of the raised portion 36. As stated above, it should be understood by one skilled in the art that the stops 48 are excluded for insertion of the devices 10 shown in FIGS. 3 and 5. The edge 20 of the blade 18 is securely received in slot 46 within the surface 64 of the channel 38. The edge 20 of the blade 18 may be secured therein by any means known in the art, such as by being adhesively secured therein, retained by friction fit or wedged therein, and the like. It should be understood by one skilled in the art that the device of FIG. 3 also is similarly inserted into the mold 26 as discussed above. In addition, it should be further understood that the stiffening member or bar 32 of FIG. 1 may be utilized in conjunction with the blade 18 of FIG. 3 having the proximal end 33 extending into the cavity 28 wherein the proximal end 33 may be positioned at least substantially adjacent the bar 32 thereby permitting removal of the stops 48 in the mold 26 of FIGS. 4 and 4A. The device 10 of FIG. 5, with separate stiffening member 32, and its placement into mold 26 is discussed next.

FIG. 5 shows mold 26 for molding a tire tread 14 wherein the stiffening member 32 is provided separately from the device 10 and securely fixed in position within the cavity 28 (See FIGS. 1 and 3) of the body member 16 by having the ends 62 thereof secured within opposing raised portions 36. Specifically, to equip the mold 26 with the device 10 including the stiffening member 32, the body member 28 and blade 18 similarly are secured (as described above), such as by friction fit or by being wedged, within one of the grooved areas 42 and corresponding slot 45 so that the body member 16 extends across the width of the channel 38 between raised portions 36. The edge 20 of the blade 18 again may be secured therein by any means known in the art such as by being adhesively secured therein, retained by friction fit or wedged therein, and the like.

The stiffening member 32 then is inserted through raised portion 36, through the cavity 28 along the length (l) of the body member 16 (as represented by arrow 47), and then secured within opposing raised portion 36 so that the stiffening member 32 is securely fixed in position within the cavity 28 substantially adjacent the inner surface 34 of the body member 16 in a position opposite the blade 18. Accordingly, the stiffening member 32 provides a desired rigidity to the body member 16, thereby limiting flexion along the length (l) thereof under the stress generated during the molding process after the mold 26 is closed, wherein the stress is transmitted through the the rubber formulation as discussed below.

The device 10, i.e. the slot 46 and corresponding groove 42 with slot 45, of the present invention may be oriented at any desired angle, advantageously, at about a 60-90° angle, and more advantageously, at about a 75-90° angle relative to the surface 64 of the channel 38 for forming the keyhole sipe 12 for optimal worn groove hydroplaning performance. It should be understood that any number of cooperating grooved areas 42 with slots 45 may be provided on the side walls 40 of raised portions 36 for receiving the device 10 of the present invention.

With further reference to FIGS. 4 and 6A, when the desired number of devices 10 is securely situated in mold 26, the rubber formulation for the tread 14 is introduced therein. The mold 26 is closed and the tread 14 allowed time to cure. Notably, the stiffening member 32 provides a desired rigidity to the deformable body member 16, thereby limiting flexion inwardly of the body member 16 along its length (l) proximate the stiffening member 32 under the stress of the rubber formulation when the mold 26 is closed. More specifically, the stiffening member 32 resists the forces applied, during the molding process, which generally imposes pressure outwardly from the interior of the green tread 14 toward the boundary defined by the surface 64 of the mold 26. Finally, after curing, the mold 26 is opened and the tread 14 removed therefrom.

During removal, as best shown in FIGS. 6B and 6C, the body member 16 compresses, or deforms, inwardly along its sides 68, thereby elongating to provide low stress on the tread 14 when the slit 24 of the formed keyhole sipe 12 is pulled around the body member 16. The edge 20 and ends 70 of the blade 18 remain secured within the mold 26 during this deformation. As best shown in FIG. 6D, after tread 14 removal, if the material of the deformed body member 16 includes an elastic property, the body 16 will return to its pre-deformed condition and the molding process may be repeated anew. Otherwise, the device(s) 10 will need to be replaced.

Figure 7:
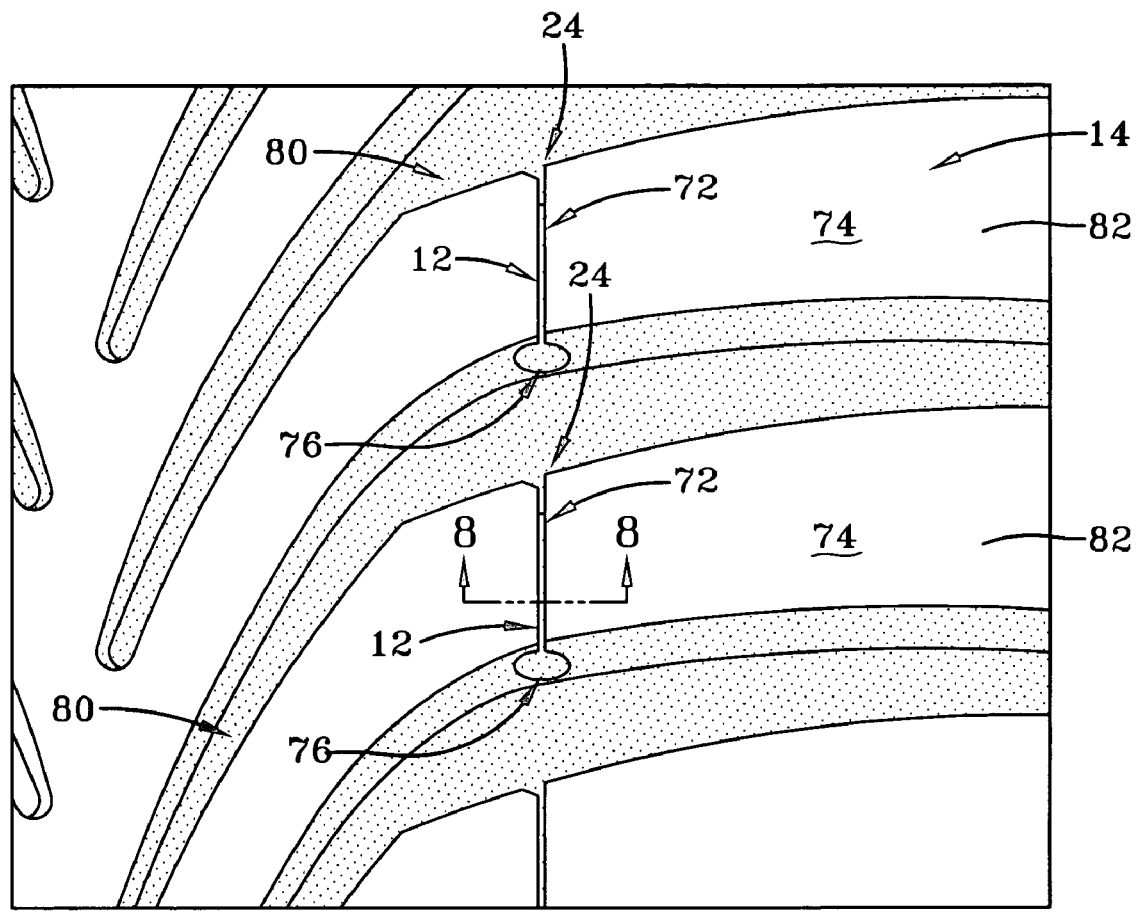
FIG. 7 is a perspective view of the formed tread from FIG. 6D.
Figure 8:
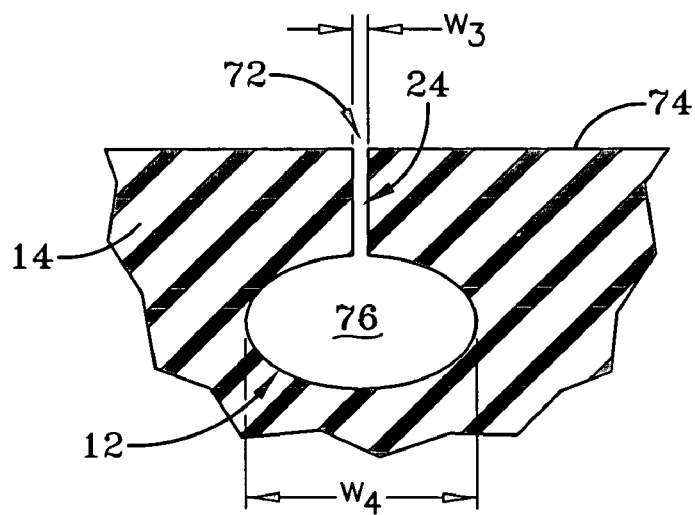
FIG. 8 is a cross-sectional view of the tread of FIG. 6 taken along lines 8-8.

Although, the formation of the tread 14 has been illustrated with respect to the device 10 of FIG. 1, it should be understood by one skilled in the art that the devices 10 of FIGS. 3 and 5 perform in the same manner to produce the formed tread 14 as shown in FIGS. 7 and 8 and further described below.

With continuing reference to FIGS. 7 and 8, the formed tread 14 includes a plurality of keyhole sipes 12 each having the slit 24 defining an opening 72 at a surface 74 of the tread 14 and a passage 76 formed therebelow that cooperates with the slit 24. Notably, the raised portions 36 of the mold 26 provide the tread 14 with grooves 80 while the channel 38 provides a tread block 82 with the keyhole sipes 12 extending from one groove 80 to the other groove 80 across the width of the block 82. Consequently, the slit 24 of the formed keyhole sipe 12 has a width ($w_3$) of about 0.3 to 2.0 mm, advantageously, about 0.5 to 1.0 mm, and the passage 76 has a width ($w_4$) of about 3-12 mm, advantageously, about 4-11 mm, more advantageously about 5-10 mm, thereby providing a more desirable wet traction performance for a tire, and a reduction in air transfer noise.

Accordingly, there is provided the device 10 of the present invention for molding keyhole sipes 12 larger in size, i.e. sipes 12 having a wider passage 76, than currently being formed in treads 14, which avoids damaging the tread 14 during formation and removal thereof from the mold 26.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A device for forming a keyhole sipe in a tire, comprising:
    an elongated body member composed of a deformable material and having cavity extending therethrough along a length thereof;
    a blade extending in a direction away from the body member and substantially alone the length thereof, the blade including a distal end defining an edge and a proximal end terminating at and secured to an outer surface of the body member; and
    a stiffening member securely fixed in position within the cavity and extending substantially along the length of the body member to provide rigidity thereto, thereby limiting flexion of the body member.

2. The device of claim 1 wherein the stiffening member is secured within the cavity to an inner surface of the body member in a position substantially opposite the blade.

3. The device of claim 1 wherein a width of the stiffening member is in the order of a thickness of the blade.

4. The device of claim 1 wherein the deformable material includes an elastic material, shape memory material, metal, or metal alloy.

5. The device of claim 1 wherein the blade includes a thickness of about 0.3 to 2.0 mm and the body member includes a width of about 3-12 mm.

6. The device of claim 5 wherein the body member further includes a height of about 3-6 mm and the blade further includes a height of about 3-6 mm.

7. The device of claim 1 wherein the body member further includes a flange extending outwardly from the body member at a location opposite the blade.

8. A mold for molding a tire tread having a keyhole sipe, comprising:
    at least two raised portions having a channel therebetween, each raised portion including a grooved area; and
    at least one device for forming the keyhole sipe in the tread, the device including opposing ends along the length thereof with each end secured respectively within the grooved areas of each of the raised portions so that the device extends across the width of the channel between the raised portions, the device including
        an elongated body member composed of a deformable material and including a cavity extending therethrough along a length thereof,
        a blade extending in a direction away from the body member and substantially along the length thereof and including a distal end defining an edge and a proximal end terminating at and secured to an outer surface of the body member, and a stiffening member securely fixed in position within the cavity and extending substantially along the length of the body member to provide rigidity thereto, thereby limiting flexion of the body member during formation of the keyhole sipe.

9. The mold of claim 8 wherein each grooved area further includes a stop adapted to abut against an end of the stiffening member to limit deformation of the body member during formation of the keyhole sipe.

10. The mold of claim 9 wherein the stiffening member is secured within the cavity to an inner surface of the body member in a position substantially opposite the blade.

11. The mold of claim 8 wherein the blade is situated at about a 60-90° angle relative to the surface of the channel.

12. The mold of claim 8 wherein the blade further includes a thickness of about 0.3 to 2.0 mm and the body member further includes a width of about 3-12 mm to form the keyhole sipe in the tire.

13. The mold of claim 12 wherein the thickness of the blade is about 0.5 to 1.0 mm and the width of the body member is about 5-10 mm.

14. The mold of claim 13 wherein the body member further includes a height of about 3-6 mm and the blade further includes a height of about 3-6 mm.

15. The mold of claim 8 wherein the body member further includes an inner surface and the stiffening member includes opposing ends with each end being secured within one of the raised portions to securely position the stiffening member within the cavity, the stiffening member extending along the length of the body member adjacent the inner surface to provide rigidity thereto.

16. A device for forming a keyhole sipe in a tire, comprising:

an elongated body member composed of a deformable shape memory polymer and having a cavity extending therethrough along a length thereof;

a blade extending in a direction away from the body member and substantially along the length thereof, the blade including a distal end defining an edge and a proximal end; and a stiffening member securely fixed in position within the cavity and extending substantially along the length of the body member to provide rigidity thereto, thereby limiting flexion of the body member.

17. The device of claim 16 wherein the stiffening member is secured within the cavity to an inner surface of the body member in a position substantially opposite the blade.

18. The device of claim 16 wherein the body member further includes a flange extending outwardly from the body member at a location opposite the blade.

19. A mold for molding a tire tread having a keyhole sipe, comprising:

at least two raised portions having a channel therebetween, each raised portion including a grooved area; and at least one device of claim 17 for forming the keyhole sipe in the tread, the device including opposing ends along the length thereof with each end secured respectively within the grooved areas of each of the raised portions so that the device extends across the width of the channel between the raised portions.

20. The mold of claim 19 wherein each grooved area further includes a stop adapted to abut against an end of the stiffening member to limit deformation of the body member during formation of the keyhole sipe.

\* \* \* \* \*

UNITED STATES PATENT AND TRADEMARK OFFICE
CERTIFICATE OF CORRECTION

PATENT NO. : 7,661,942 B2 Page 1 of 1
APPLICATION NO. : 11/186612
DATED : February 16, 2010
INVENTOR(S) : Gia-Van Nguyen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

CLAIM 1
Column 8, Line 26
Change "alone the length" to --along the length--

Signed and Sealed this

Second Day of November, 2010

David J. Kappos
*Director of the United States Patent and Trademark Office*